Sept. 6, 1966 H. G. ROCHOLL 3,270,481
METHOD OF AND MECHANISM FOR CLOSING BAGS
Original Filed Feb. 23, 1961 8 Sheets-Sheet 1
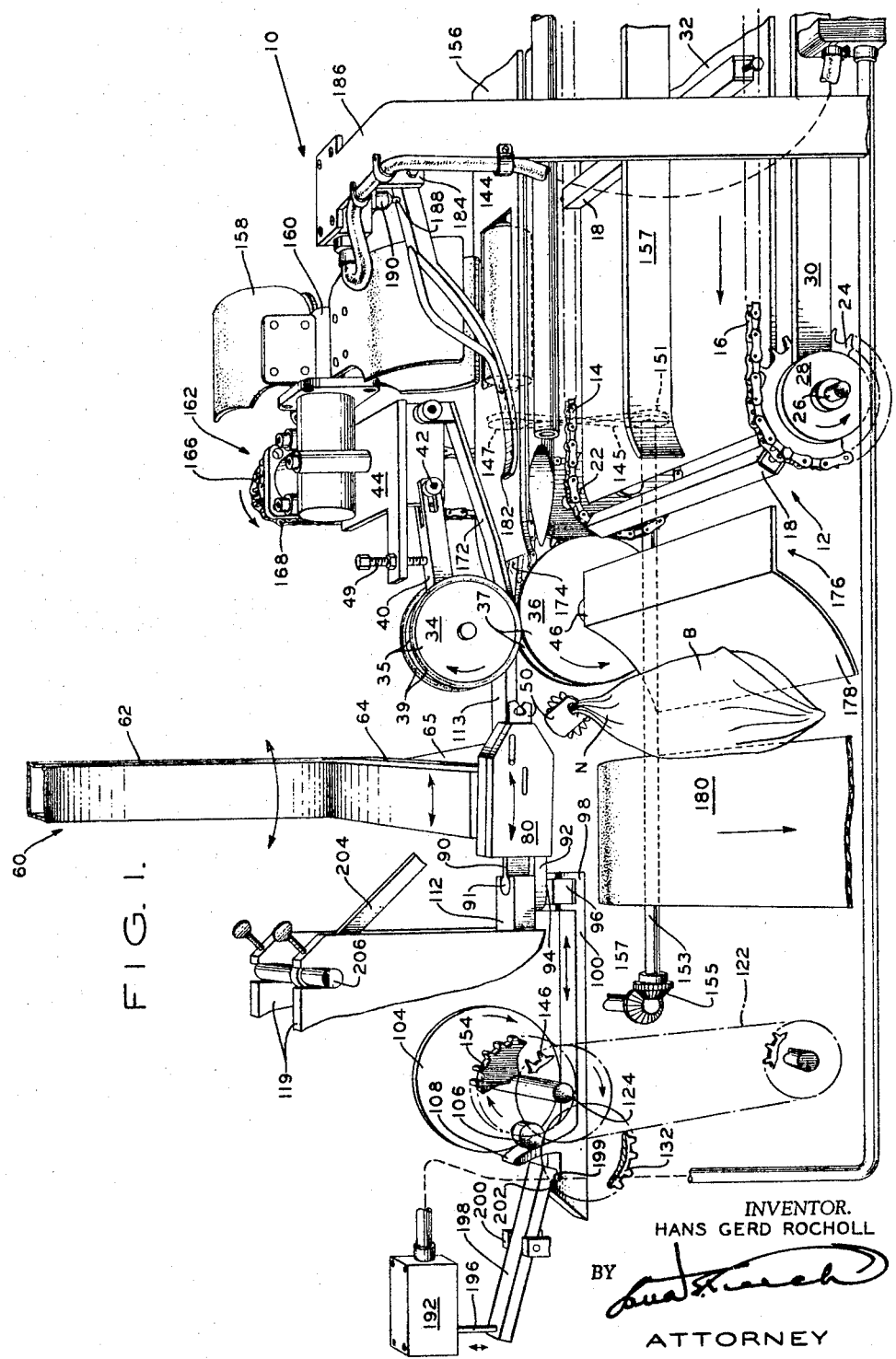
INVENTOR.
HANS GERD ROCHOLL
BY
ATTORNEY

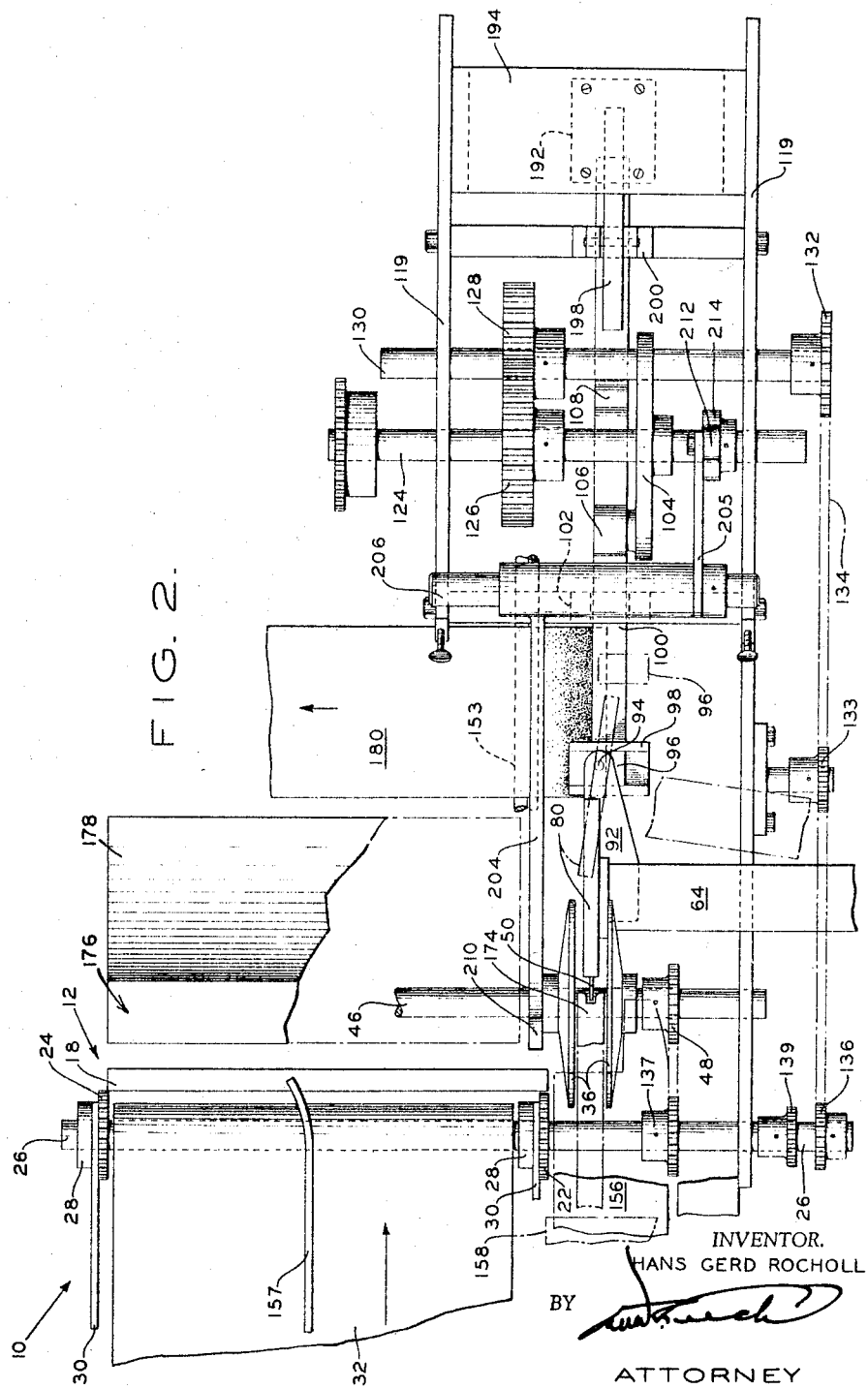

Sept. 6, 1966    H. G. ROCHOLL    3,270,481
METHOD OF AND MECHANISM FOR CLOSING BAGS
Original Filed Feb. 23, 1961    8 Sheets-Sheet 3
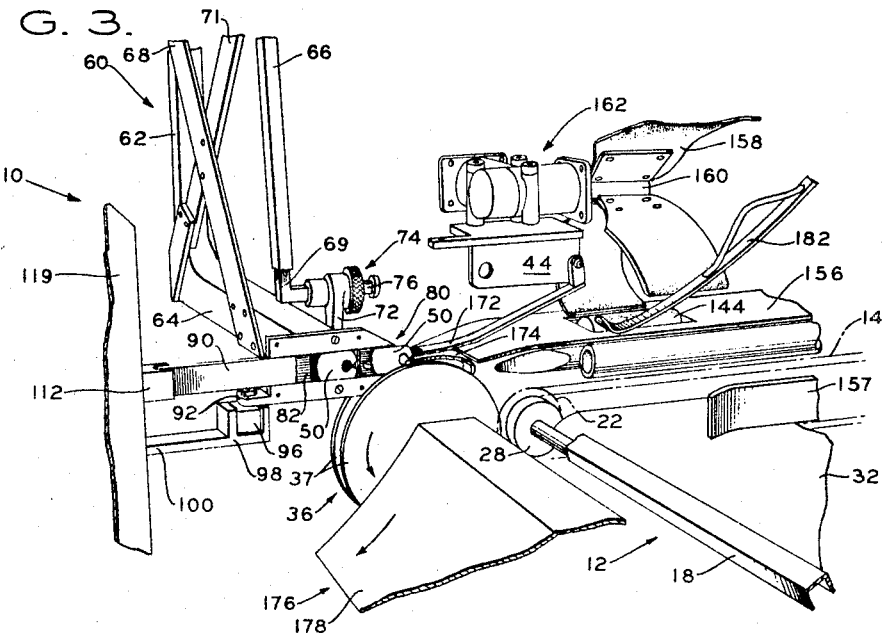
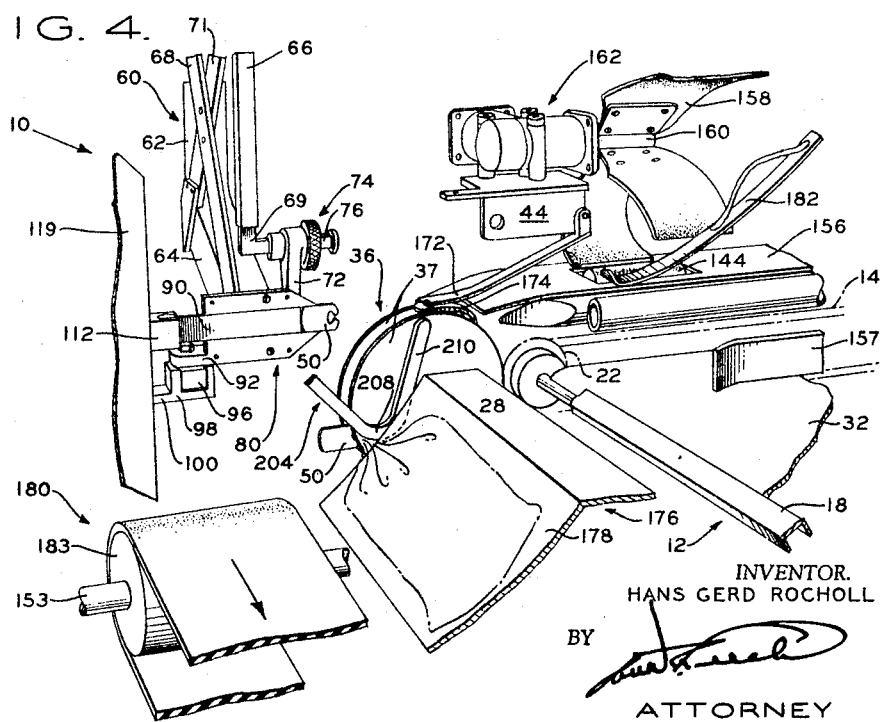
INVENTOR.
HANS GERD ROCHOLL
BY
ATTORNEY

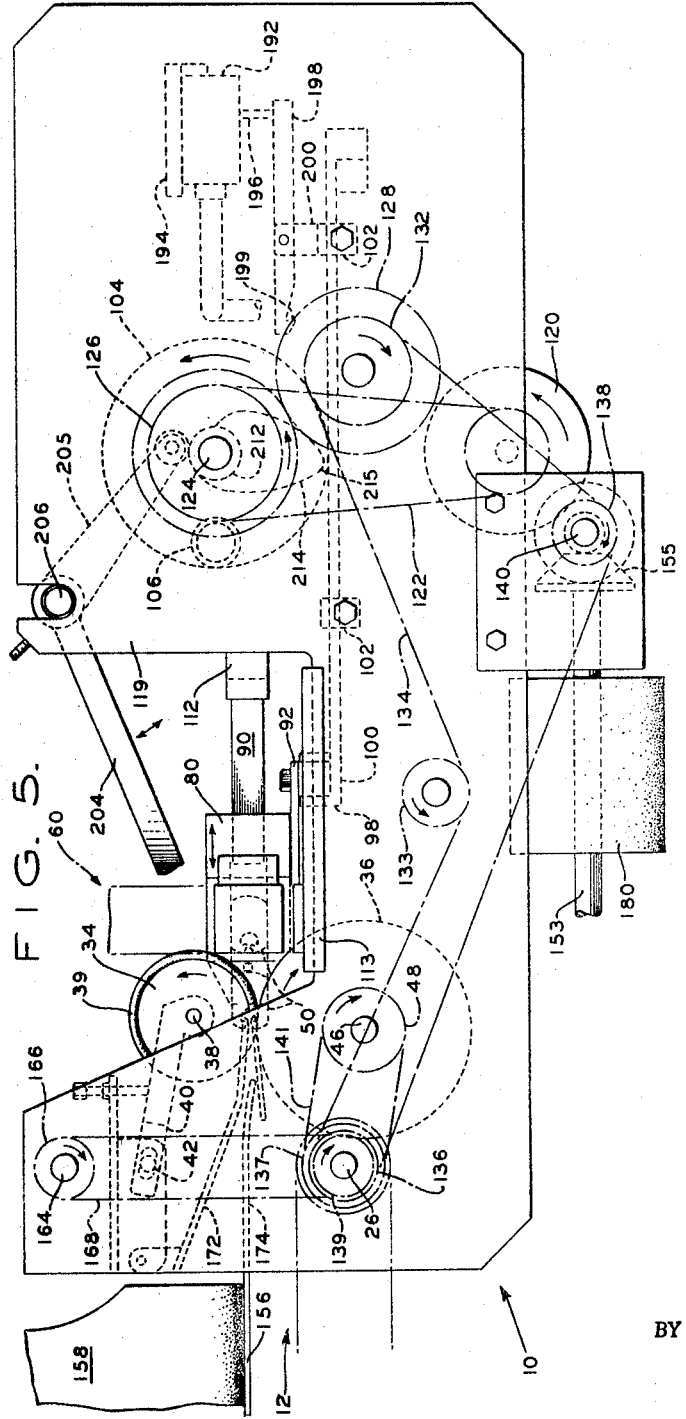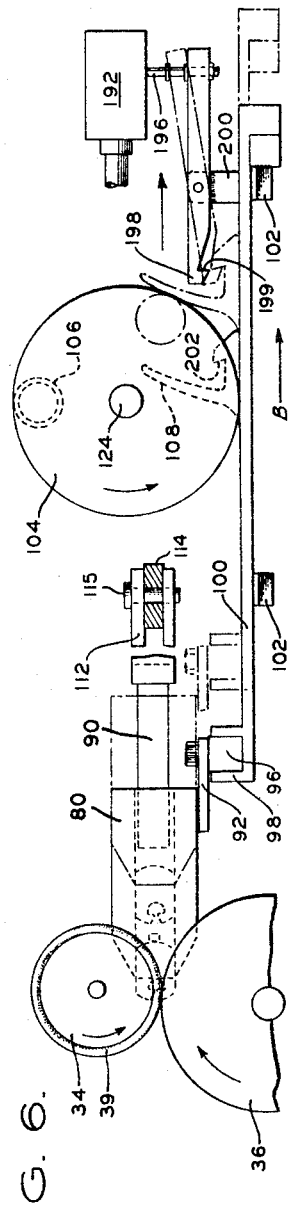

Sept. 6, 1966  H. G. ROCHOLL  3,270,481
METHOD OF AND MECHANISM FOR CLOSING BAGS
Original Filed Feb. 23, 1961  8 Sheets-Sheet 5
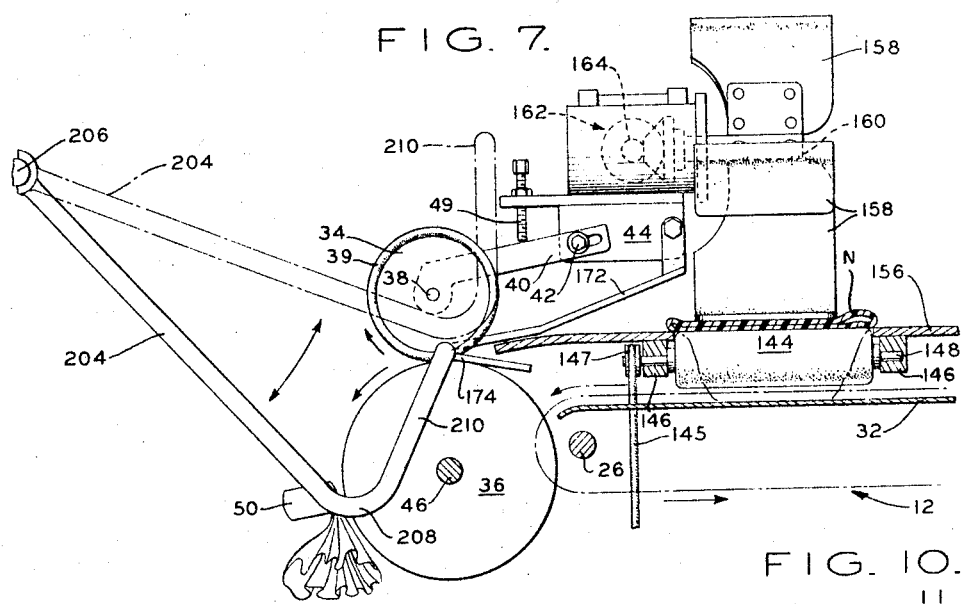
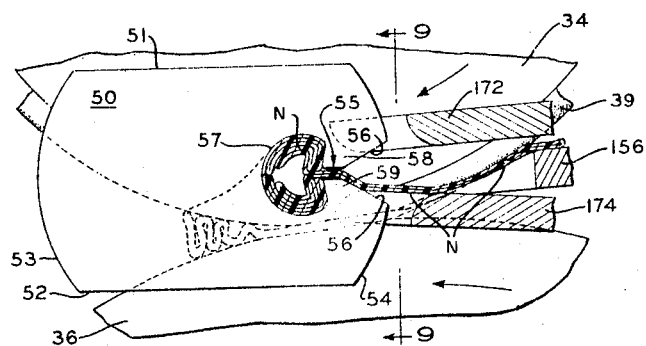
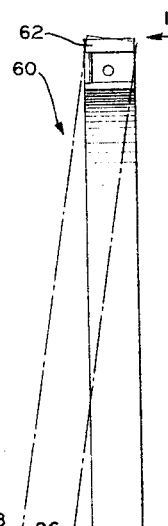
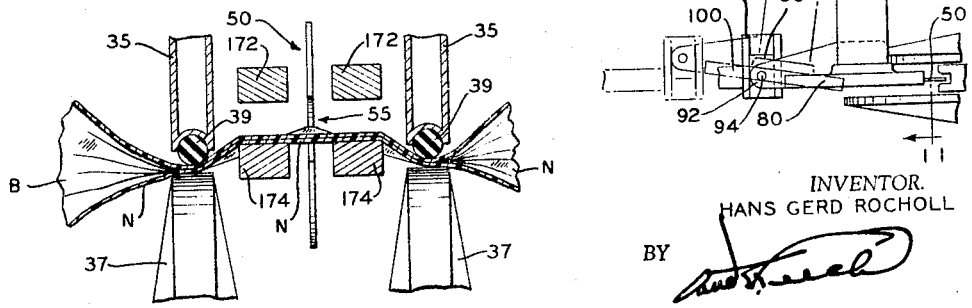
INVENTOR.
HANS GERD ROCHOLL
BY 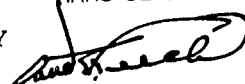
ATTORNEY Sept. 6, 1966  H. G. ROCHOLL  3,270,481
METHOD OF AND MECHANISM FOR CLOSING BAGS
Original Filed Feb. 23, 1961  8 Sheets-Sheet 6
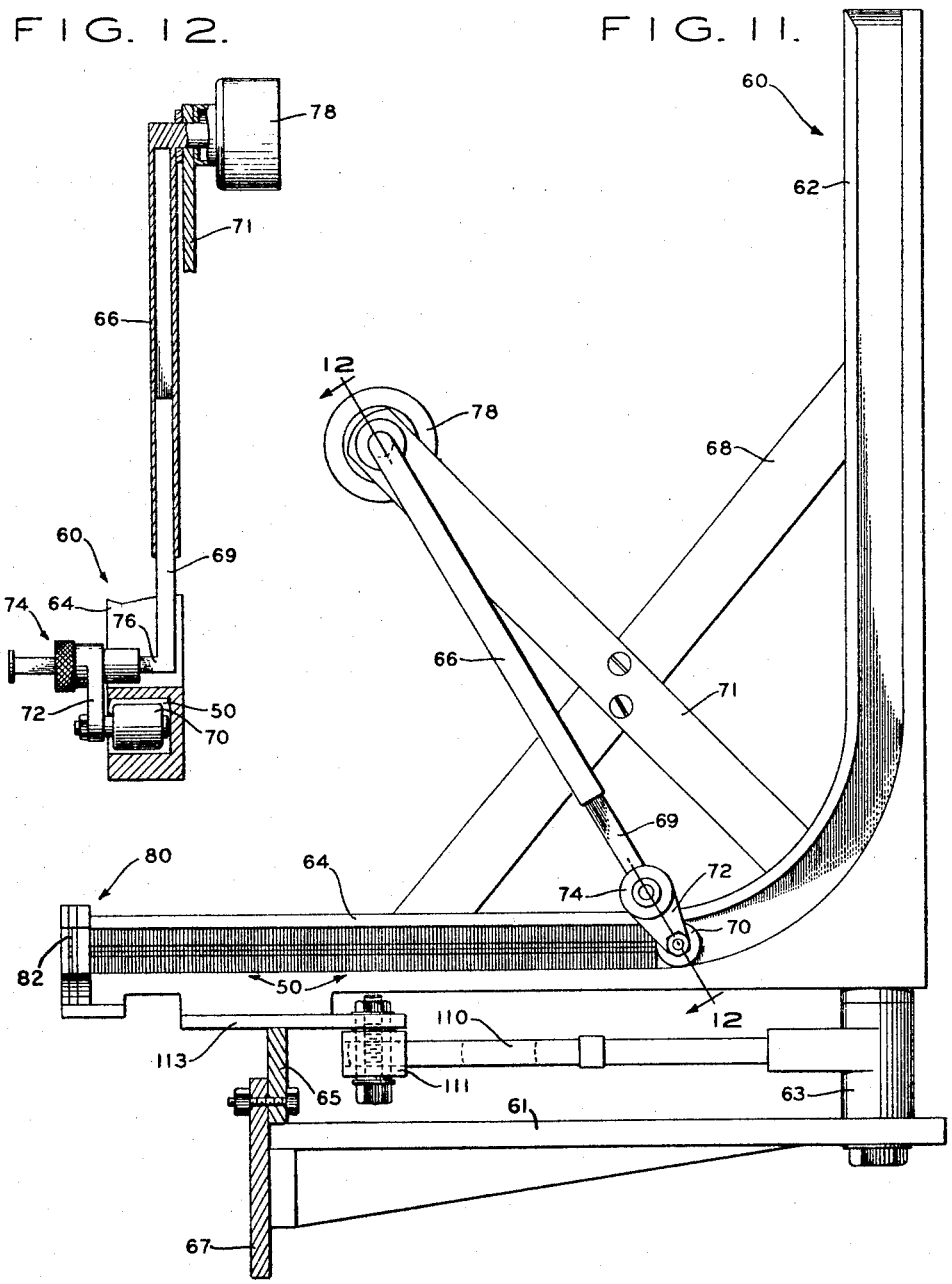
INVENTOR.
HANS GERD ROCHOLL
BY
ATTORNEY Sept. 6, 1966   H. G. ROCHOLL   3,270,481
METHOD OF AND MECHANISM FOR CLOSING BAGS
Original Filed Feb. 23, 1961   8 Sheets-Sheet 7

INVENTOR.
HANS GERD ROCHOLL
BY
ATTORNEY

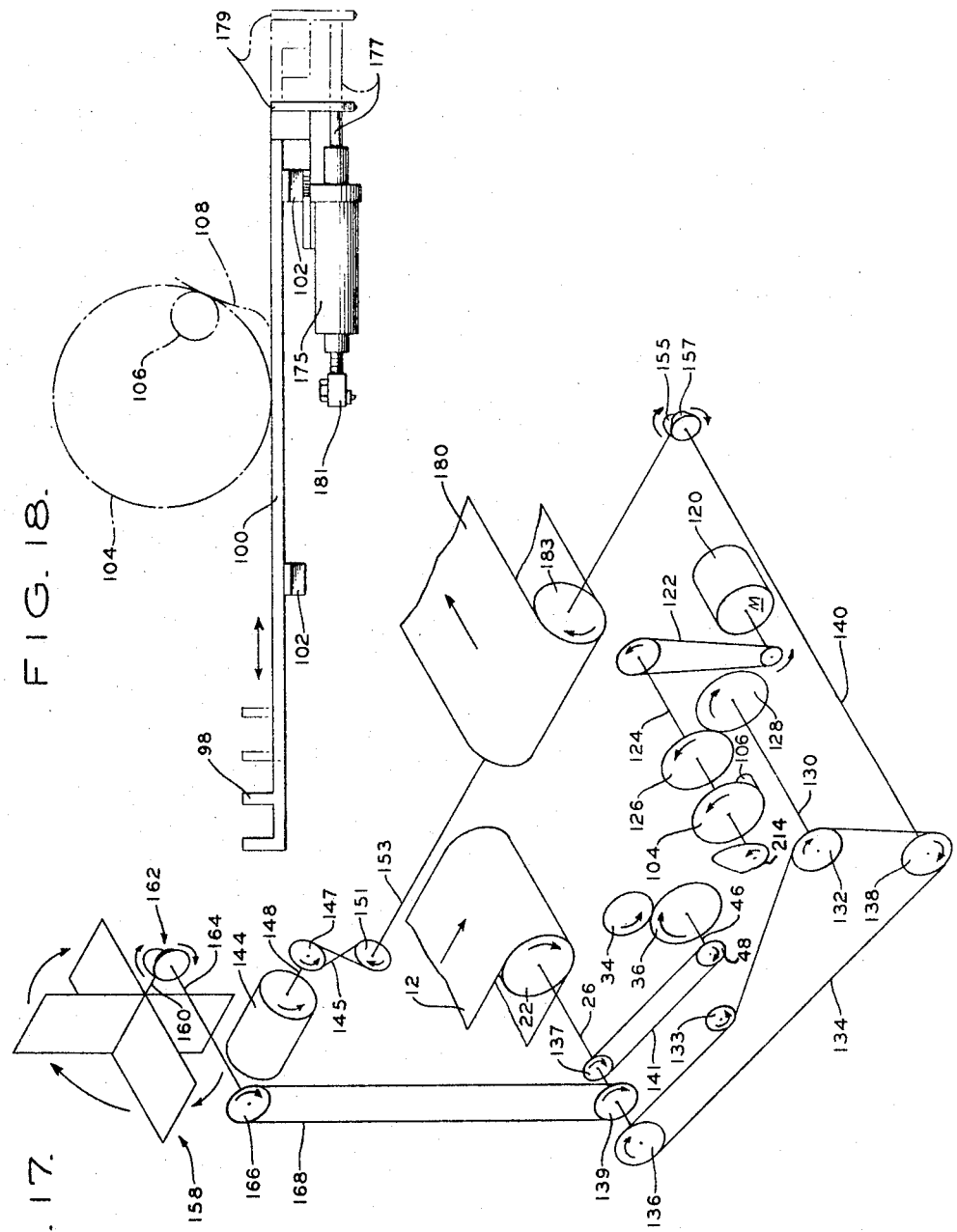

United States Patent Office 3,270,481
Patented Sept. 6, 1966

3,270,481
METHOD OF AND MECHANISM FOR
CLOSING BAGS
Hans Gerd Rocholl, Salt Lake City, Utah, assignor, by mesne assignments, to Kwik Lok Corporation, Yakima, Wash., a corporation of Washington
Continuation of application Ser. No. 91,008, Feb. 23, 1961. This application Oct. 22, 1965, Ser. No. 502,665
17 Claims. (Cl. 53—14)

This application is a continuation of my co-pending application Serial No. 91,008 filed February 23, 1961, on Closure Mechanism, said application Serial No. 91,008 now being formally abandoned.

This invention relates to a method of and mechanism for applying a particular type of closure about the open neck portion of a flexible container such as a polyethylene bag so as to package a product previously placed in said bag. The closure with which this invention is particularly effective is of the type disclosed in the patent to F. G. Paxton et al. No. 2,907,586 which comprises a relatively stiff but flexible flat tab of sheet material having a closure aperture spaced inwardly a short distance from one edge thereof, access to said aperture being had through a narrow slot provided in said closure edge.

Heretofore, closures of the type above described have been widely used in manually closing the necks of polyethylene bags, this method being disclosed in U.S. Patent to Paxton et al. No. 2,705,100. The latter patent also discloses a device for successively delivering bag closure tabs into a position where the narrow tab edge opening is exposed to engagement by a bag neck manually pushed thereagainst so as to deflect the material of the tab to widen said slot and thereby admit the bag neck into the closure aperture. Following application of a bag to each such closure tab, the latter is adapted to be withdrawn from the closure feed device by pulling on the bag neck applied to said closure.

A primary object of the invention is to provide a novel method of closing the slack neck of a partially filled flexible plastic bag with a closure tab of the aforementioned type, which method will follow a simple, novel principle which will adapt it to power performance.

It is also an object of the present invention to provide a powered bag closure applying mechanism for the performing of said method and in which the introduction of the bag neck through said narrow slot and into said aperture of said tab will be power accomplished by said mechanism.

It is a further object of the invention to provide such a mechanism which will power deliver into the closure aperture an entire transverse section of a bag neck by introducing the same edgewise progressively in flattened condition through said narrow slot and into said aperture.

Still another object of the invention is to provide such a mechanism having means for delivering thereto a series of product loaded flexible bags with their open necks flattened parallel with the direction of their delivery and with each neck approximately aligned with the receiving slot of an aperture of a closure provided in said mechanism for receiving such bag neck.

The manner of accomplishing the foregoing objects, as well as further objects and advantages, will be made manifest in the following description taken in connection with the accompanying drawings in which:

FIG. 1 is a perspective view of the preferred embodiment of the mechanism of the present invention.

FIG. 2 is a partial plan view of FIG. 1.

FIG. 3 is a partial perspective view of the tab magazine and tab head and tab applying mechanism of the invention operatively related in applying a tab to a bag.

FIG. 4 is a partial perspective view of the tab magazine and head retracted as it is moving from non-operative position toward operative position.

FIG. 5 is a partial side elevation of the mechanism shown in FIG. 2.

FIG. 6 is a partial side elevation of the tab magazine actuating mechanism.

FIG. 7 is a side elevation of the bag neck flattening mechanism and the means for discharging a bag to which a closure has just been applied.

FIG. 8 is a side elevation of the closure tab adapted to be used with the present invention with the latter in the process of applying said closure tab to a bag to close said bag.

FIG. 9 is a sectional view taken along line 9—9, FIG. 8.

FIG. 10 is a plan view of the tab magazine.

FIG. 11 is a side elevation, partially in section, taken along line 11—11, FIG. 10.

FIG. 12 is a sectional view taken along line 12—12, FIG. 11.

FIG. 17 is a schematic transmission diagram of the various drive mechanisms of the present invention.

FIG. 18 is a side elevation of the magazine and head actuating mechanism.

Figure 13:
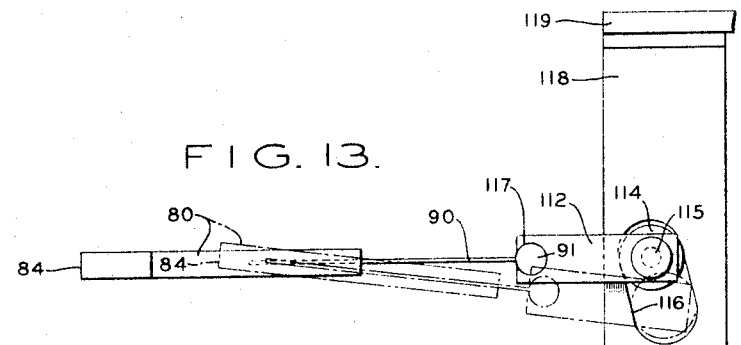
FIG. 13 is a plan view of the tab ejector mechanism.

Referring to the drawings, the closure mechanism, designated generally 10, embodying the present invention is illustrated at the delivery end of a longitudinal endless bar conveyor 12. Conveyor 12 includes a pair of spaced conveyor chains 14 and 16 which support each end of a plurality of spaced, transverse pusher bars 18. Chains 14 and 16 are trained over a pair of spaced sprockets 22 and 24 which are mounted on shaft 26 adjacent mechanism 10. Shaft 26, in turn, is rotatably carried in suitable bearings 28 mounted on brackets 30 of the conveyor frame. Shaft 26 is driven as described hereinbelow to cause bars 18 to travel along support plate 32 of the conveyor frame from a loading station (not shown) to mechanism 10.

Mechanism 10 includes two tangentially coacting pairs of pinch rollers 34 and 36. Upper pair of rollers 34 is rotatably supported on a stud shaft 38 carried in a link arm 40 pivotally connected by pin 42 to bracket 44 on the main machine frame. Lower pair of rollers 36, in turn, is fixed to one end of and rotates with a drive shaft 46 (FIG. 2). Pinch rollers 34 and 36 are preferably provided with dual spaced contacting tracks 35 and 37 respectively.

The other end of shaft 46 is provided with a sprocket 48 driven as described hereinbelow to rotate pair of rollers 36. The tracks 35 of upper pair of rollers 34 are provided with a peripheral rim or shoe 39 of rubber or other material having a high coefficient of friction which effects rotation of rollers 34 from the rollers 36. A set screw 49, mounted in bracket 44, bears adjustably downward against arm 40 to maintain shoes 39 in frictional engagement with rollers 36.

Mechanism 10 is adapted to apply a closure tab 50, (FIG. 8) having two longitudinal edges 51 and 52, an arcuate end edge 53 and an opposite arcuate end edge 54 which is broken by a narrow central slot 55 having converging outer cam faces 56 and communicating internally with a non-circular heart-shaped aperture 57. Aperture 57 and slot 55 produce two hook-shaped jaws 58 and 59 on tab 50 which operate to hold tab 50 onto a package or container.

To feed tabs 50 in continuous succession, there is provided a tab magazine 60 of generally channel-shaped cross-section (FIGS. 10–12). Magazine 60 includes a generally vertically-disposed loading section 62 and a transverse feeding section 64 formed as a continuation of section 62. Tabs 50 in section 62 are disposed in overlying, flat relationship. As tabs 50 pass from section 62 into section 64, this disposition is altered from overlying relationship to side-by-side vertically-disposed relationship, as shown in FIG. 11. Magazine 60 is rotatably supported on a vertical axis by bearing 63 carried in bracket 61 fixed to an extension 67 of the main machine frame. A strut 68 fixed at one end to section 62 and at the other end to section 64 provides structural rigidity to magazine 60. To support the free end of section 64, there is provided a bearing support plate 65 fixed to the extension 67 of the main machine frame. Plate 65 is in slidable contact with a bearing plate 113 on second 64.

To insure continuous feeding of tabs 50, magazine 60 is provided with a feeder arm 66 pivotally mounted at one end on bracket 71 attached to magazine 60 and strut 68. Arm 66 is provided at its free end with a telescoping extension 69. A pressure roller 70, adapted to be positioned against the last tab 50 in magazine 60 is rotatably carried in one end of arm 72. Arm 72 in turn is fixed to hub 74 slidably mounted on a transverse section 76 of telescoping extension 69. A tension coil spring 78 housed on bracket 71 bears against an extension of arm 66 to apply sufficient pressure to roller 70 to insure continuous, positive feed of tabs 50 through magazine 60.

Figure 14:
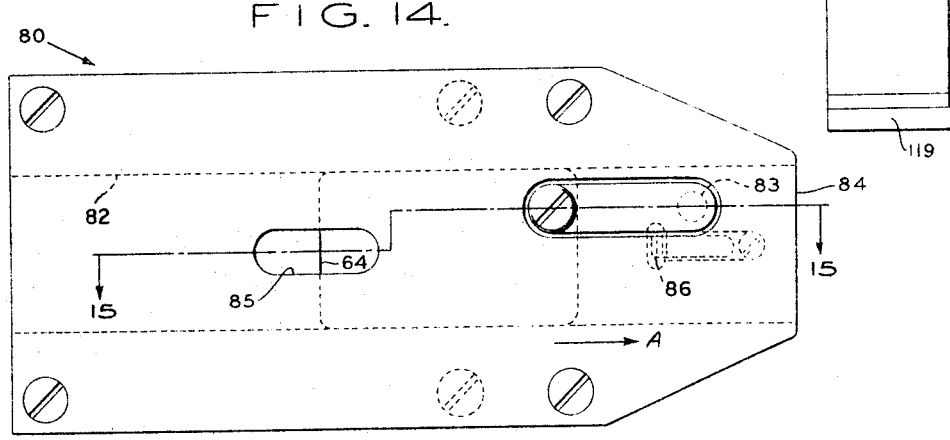
FIG. 14 is a side elevation of the head.
Figure 15:
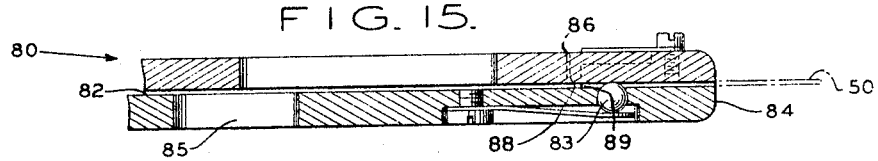
FIG. 15 is a sectional view taken along line 15—15, FIG. 14.

At the end of section 64 remote from loading section 62 there is provided a tab positioning head 80. Head 80, shown best in FIGS. 14 and 15 includes an internal slot 82 of sufficient width to accommodate a tab 50, disposed in vertical position as shown in FIG. 3. Slot 82 communicates directly with section 64 such that tabs 50 urged through sections 62 and 64 by pressure roller 70 enter slot 82. Head 80 and slot 82 accommodate two tabs 50 when head 80 and magazine 60 are in operative bag-securing position shown in FIG. 3.

In this position, a first tab 50 fed to head 80 is positioned with its aperture 57 extending out beyond the end 81 of head 80 and into position between the tracks 35 and 37 of rollers 34 and 36. The arcuate extremity 53 of tab 50 remote from aperture 57 is positioned against resiliently-biased stop member 86 in head 80. Stop 86 is preferably of wedge-shape with a cam face 88 and a stop face 89. Stop 86 permits tabs 50 to move in slot 82 only in in the direction of arrow A, FIG. 14. The second tab 50 fed to head 80 is positioned in slot 82 in alignment with the tabs 50 still in section 64. (See FIG. 3.) A spring-biased ball detent 83 bears against first tab 50 in slot 82 to assist in maintaining the tab in operative bag-closing position. An opening 85 provides visual access to slot 82 for inspection of tab feed.

The portion of slot 82 remote from end 84 accommodates an elongated flexible, ejector member 90 slidably mounted therein. Ejector 90 is operative to eject the first tab 50 from head 80 and position the second tab 50 in operative bag securing position.

To effect pivotal movement of magazine 60 into and out of operative position and away from pinch rollers 34 and 36 for reasons made apparent hereinafter, the end of magazine 60 adjacent head 80 is provided with a lateral extension 92. The free end of extension 92 is rotatably secured by pin 94 to a block 96 slidably accommodated in guide 98. Guide 98, in turn, is carried at one end of a horizontally reciprocating operating arm 100, slidably supported on transverse supports 102 carried in the main machine frame. Arm 100 is moved in the direction of arrow B, FIG. 6, by a rotating cam 104. Cam 104 is provided with a cam roller 106 adapted to engage a cam block 108 during a portion of the rotation of cam 104. Upon engagement of cam block 108, cam roller 106 is operative to move arm 100 along supports 102 in the direction of arrow B.

To normally maintain magazine 60 and its associated mechanism in its operative position shown in FIG. 3, a leaf spring 110 (FIG. 11) is fixed at one end to bearing 63, the free end of spring 110 bearing against a bearing block 111 pivotally secured to bearing plate 113, urging magazine 60 into said operative position.

As magazine 60 is moved out of operative position by the action of cam 104, as described hereinabove, ejector 90 is simultaneously effecting the ejection of the first tab 50 in head 80 and positioning the second tab 50 in operative bag-securing position. As stated above, ejector 90 is slidably mounted in slot 82 in head 80. The end 91 of ejector 90 extending rearwardly from head 80 remote from end 84 thereof (FIG. 13) is circular in cross-section and fits freely into an accommodating recess 117 in one end of a guide block 112. Guide block 112 is secured by pin 115 to a cam roller 114. Roller 114 in turn is mounted for travel back and forth in an elongated slot track 116 in a transverse guide 118 supported at each end in extensions 119 of the main machine frame. With this arrangement, ejector 90 is always disposed in alignment with slot 82 during any movement of head 80 and thereby eliminates bending and damage to ejector 90.

As head 80 and magazine 60 are rotated away from operative position, ejector 90 is traveling forwardly relative to head 80 through slot 82 toward end 84 of head 80. As it moves through slot 82, the free end of ejector 90 engages the second tab 50 in head 80 and moves it toward front end 84, against cam face 88, urging stop 86 out of the path of travel of the second tab 50. As ejector 90 continues to move second tab 50 through head 80, the front or leading edge 54 of second tab 50 engages the rear or trailing edge 53 of first tab 50, thereby urging the first tab 50 out of head 80, and positioning the second tab 50 engaged by ejector 90 in the position of the previous first tab 50.

It will be understood that ejector 90, head 80 and their associated mechanisms are so dimensioned and positioned that when ejector 90 has reached its limit of travel in head 80, the tab 50 engaged thereby is positioned with its heart-shaped aperture 57 extending outwardly from the front edge 84 of head 80 in operative, bab-securing position (FIG. 8).

It will also be evident that by providing a flexible ejector 90 having a degree of freedom laterally to the general direction of travel of head 80, relative movement between ejector 90 and head 80 is assured without binding or damage to the various mechanisms.

Drive shaft 124 (FIG. 17) is provided with a drive gear 126 fixed thereto which meshes with and rotates a cooperating gear 128 on one end of shaft 130 carried in the machine frame. Shaft 124 also supports cam 104 for rotation therewith. The other end of shaft 130 is provided with a sprocket 132 which is the power source for endless chain 134 trained therearound. Chain 134 is trained for travel about sprocket 132, sprocket 136 fixed to shaft 26 of conveyor 12 and a sprocket 138 mounted on one end of a shaft 140 carried in the machine frame. Shaft 26 is also provided with a second sprocket 137. Sprocket 137 drives an endless chain 141, the other end of which is trained around sprocket 48 fixed to shaft 46. An idler sprocket 133 maintains chain 134 out of the path of travel of magazine 60. Thus, shaft 124 effects timed movement of conveyor 12, pinch rollers 36 and cam 104, and this shaft is driven by an electric motor 120 through an endless chain 122.

An operator at the loading station inserts the articles to be packaged such as loaves of bread, in flexible plastic bags B and then places them transversely on conveyor 12 parallel with and in the path of travel of bars 18. The bags are placed with their open ends or necks N on plate 156 and with their closed ends guided by guide 157 on plate 30. As the bags B approach mechanism 10, the bag necks N are wiped flat against plate 156 and straightened by a paddle mechanism (FIGS. 1, 7 and 11) supported on bracket 44 and including spaced, flexible paddles 158 fixed to and rotating with shaft 160. Shaft 160 (FIG. 17) is driven through intermediate right angle gearing 162 from transverse shaft 164 to which is fixed a sprocket 166. An endless chain 168 is trained around sprocket 166 and around a third sprocket 139 on rotating shaft 26, thus actuating paddles 158.

A roller 144 provided with a covering of material having a high coefficient of friction, such as rubber, cooperates with paddles 158 to straighten the bottom portion of the necks N of the bags B on conveyor 12. Roller 144 (FIG. 7) supported on a shaft 148 mounted in suitable bearings 146 on the underside of guide plate 156. The end of shaft 148 (FIG. 17) has a pulley 147 thereon which is driven from resilient pulley belt 145. Belt 145 is trained at its other end around pulley 151 fixed to elongated shaft 153. As will be noted, belt 145 is crossed between pulleys 151 and 147 so that roller 144 is rotated in the opposite directions than shaft 160. Shaft 153, in turn, is provided at its other end with a bevel gear 155 which meshes with and is driven by a transverse pinion 157 fixed to the end of shaft 140 remote from sprocket 138.

Upon leaving the area in which the wiping action of paddles 158 and bottom roller 144 takes place, the flattened neck N of an article-carrying bag B on conveyor 12 passes between spaced upper and lower flap guides 172 and 174 and into the bight between tracks 35 and 37 of pinch rollers 34 and 36. As the flattened neck N is engaged by rollers 34 and 36, the remainder of the bag B and the loaf contained therein are delivered from conveyor 12 onto bridge plate 176 supported on shaft 46. The leading edge of flattened neck N of the bag B is pinched at spaced points along its leading side edge by rollers 34 and 36 and fed in flattened form past jaws 58 and 59 of the first tab 50 providing from head 80 in operative position between rollers 34 and 36, and through slot 55 into aperture 57 thereof, thus positioning said tab 50 in securing position about the neck N of said article-carrying bag B.

Upon completion of the insertion of the bag neck N into aperture 57 of tab 50, cam roller 106 is rotated into engagement with block 108 moving head 80 away from rollers 34 and 36. Simultaneously therewith, ejector 90 is caused to move the second tab 50 edge to edge against the first tab 50, effecting the ejection of first tab 50 from head 80. When the first tab 50, now positioned in securing position about the neck N of the bag, is thus ejected from head 80, the bag B secured thereby slides down the inclined face 178 of bridge plate 176 (FIG. 1) onto a transverse endless conveyor 180. Conveyor 180 includes a roller 183 (FIG. 11) mounted and driven by shaft 153 to deliver closed bags B to a storage station (not shown).

The return of head 80 and magazine 60 to operative position by the action of spring 110 effects the withdrawal of ejector 90 in slot 82, permitting pressure roller 70 to feed the next successive tab 50 in section 64 into the portion of slot 82 aligned therewith.

To control the return of head 80 to operative position, a pneumatic dash-pot arrangement is provided on arm 100. (See FIG. 18.) This arrangement includes an air cylinder 175 fixed to one of the supports 102. The operating rod 177 of cylinder 175 is secured to a bracket 179 fixed to the end of arm 100. When cam roller 106 is in engagement with block 108 of rod 100, arm 177 of cylinder 175 is extended to the position shown in dotted line in FIG. 18. When block 108 is released, and spring 110 urges head 80 back into operative position, arm 177 is likewise urged thereby back into cylinder 175, as shown in solid lines, FIG. 18. However, flow control valve 181 on air cylinder 175 controls the rate of return of arm 177 by controlling the rate at which air from cylinder 175 is vented therethrough. Thus, head 80 and its associated mechanism is returned to operative position by spring 110 in a slow, controlled manner, preventing damage to the various mechanisms.

Means is also provided for interrupting the operation of arm 100 and its associated members in the event that there is an interruption in the movement of bagged articles on conveyor 12. A feeler finger 182 (FIG. 1) with one end positioned in the path of travel of articles on conveyor 12 is pivotally supported adjacent its other end on bracket 184 on extension 186 of the machine frame. The end of finger 182 remote from conveyor 12 normally engages the operating pin 188 of a normally closed switch 190. When finger 182 is lifted by a bag B passing therebeneath on conveyor 12, this opens switch 190. The closing of switch 190 completes a circuit energizing a solenoid 192 supported on a bar 194 (FIGS. 1, 2 and 6) at the limit of travel of arm 100. The armature 196 of solenoid 192 is operatively connected to one end of a latch 198, the latter being pivotally supported adjacent its midpoint on a frame yoke 200. Upon actuation of solenoid 192, armature 196 thereof effects rotation of latch 198 about its pivoted axis moving locking face 199 thereof into retaining engagement with lip 202 formed on arm 100 (FIG. 6). Latch 198 holds arm 100 in non-operative position until the next successive article on conveyor 12 engages and raises finger 182, causing this to engage pin 188 and open switch 190. With switch 190 open, solenoid 192 is de-energized, relaxing its armature 196 and effecting release of lip 202 on arm 100 from engagement with latch 198 and permitting spring 110 to return head 80 and magazine 60 to operative bag securing position.

Figure 16:
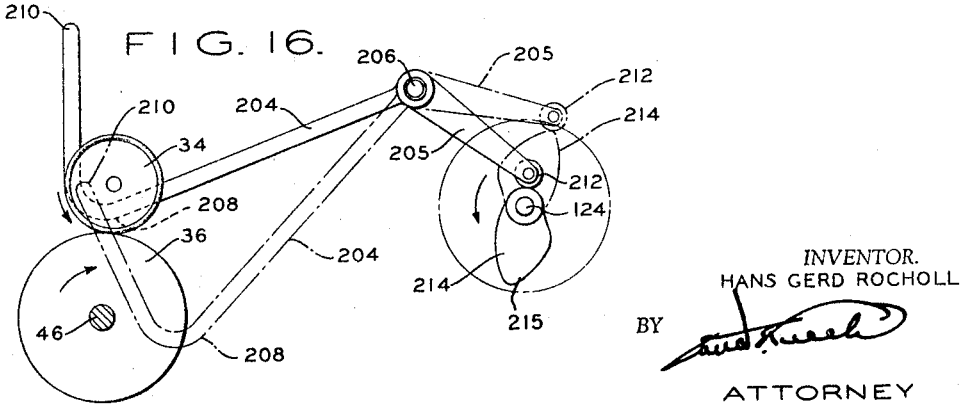
FIG. 16 is side elevation of the bag ejector mechanism.

In addition, means is provided to ensure positive movement of a secured bag B over bridge plate 176, down face 178 and onto conveyor 180. This includes a vertically reciprocating arm 204 (FIGS. 2, 5, 7 and 16) secured adjacent its midpoint to a shaft 206 rotatably mounted at the upper extremities of extensions 119 of the machine frame. Arm 204 depends downwardly from shaft 206 with the lower end 208 thereof located adjacent pinch rollers 34 and 36 and terminating in an upwardly bent extension 210. A cam arm 205 formed integral with arm 204 is provided with a cam roller 212 adapted for travel along the periphery of cam 214 secured to and rotating with shaft 124. The relative positions of arm 204 on shaft 206 and cam 214 on shaft 124, are such that arm 204 is disposed adjacent the inner edges of pinch rollers 34 and 36 as shown best in FIG. 16. As a bag B is engaged by pinch rollers 34 and 36, the end 208 of arm 204 is disposed as shown in full lines in FIG. 16, with its upward extension 210 generally vertical and end 208 disposed above the bight or horizontal plane of tangency between rollers 34 and 36. Cam 214 is so shaped that lower end 208 of arm 204 generally dwells in this position until the insertion of the bag neck N into aperture 57 of the foremost tab 50 in head 80 has been accomplished. As the securing operation is completed, shaft 124 rotates the high point 215 of cam 214 in the direction of the arrow, FIG. 16, into engagement with roller 212. This action swings cam arm 105 upwardly to its position shown in broken lines in FIG. 16, and swings arm 204 downwardly as shown in broken lines in this view. It will be understood, that arm 204, in this movement, engages the neck section N of the bag B just secured together by a tab 50, urging the secured bag and its contents downwardly along face 178 onto conveyor 180 and out of the area of operation of mechanism 10. Upon ejection of the secured bag, the continued rotation of cam 214 is effective to return arm 204 to its upper operative position shown in full lines, FIG. 16, to await arrival of the next successive bag B on conveyor 12. Arm 204 thus ensures positive ejecting of closed bags B from mechanism 10, preventing damage thereto.

What is claimed is:

1. In a device for packaging loaves of bread in flexible containers, positioning a closure tab having an access opening formed therein about the open end of said bags comprising in combination, an endless conveyor for delivering loaves of bread in bags from a loading station into the range of operation of said device, said bags on said conveyor having their open ends disposed in predetermined orientation, a magazine for holding a supply of closure tabs in selected orientation therein, means movably mounting said magazine, a positioning head operatively associated with said magazine, adapted to position successive tabs with the access opening thereof in the path of travel of the open ends of bags on said conveyor, a pair of opposed rotatable pinch rollers adapted to engage the open ends of bags on said conveyor, means normally urging said magazine and head into operative position with a tab located adjacent the bight between said rollers, means for rotating said rollers to insert the open end of a bag into the axis opening of said closure tab positioned adjacent the bight thereof, means for moving said magazine and head out of operative position and away from said pinch rollers in timed relation with the insertion by said pinch rollers of the open end of a bag into the tab positioned adjacent thereto, an ejector, and means movably mounting said ejector in said head for relative movement therein to effect ejection of said closure tab and associated container from said positioning element upon movement thereof away from said pinch rollers.

2. The invention as defined in claim 1 including means for interrupting the movement of said magazine and positioning head upon interruption of delivery of the loaves of said conveyor to said device.

3. The invention as defined in claim 1 including means for straightening the open ends of bags on said conveyor prior to engagement by said pinch rollers.

4. The invention as defined in claim 1 wherein said means movably mounting said magazine includes a reciprocating operating arm, a cam block on said operating arm, and a rotating cam constructed and arranged to engage said operating arm during a portion of its rotation to move said magazine and head against the action of said urging means and away from said pinch rollers.

5. The invention as defined in claim 1 wherein said tab-feeding means includes a pressure roller normally positioned against the last tab in said magazine, a telescoping arm, means mounting said pressure roller at one end of said telescoping arm, said arm adapting said roller for movement with said supply of tabs through said magazine, means pivotally mounting said telescoping arm adjacent its other end to said magazine, and means at the other end of said telescoping arm for normally urging said pressure roller against said tabs for feeding of successive tabs through said magazine.

6. The invention as defined in claim 1 wherein said pinch rollers are formed with dual tracks and including an upper and lower guide member for delivering the open end of said bags on said conveyor into the range of operation of said pinch rollers.

7. The invention as defined in claim 1 including an arm, means movably mounting said arm adjacent and above the bight between said pinch rollers, and means for vertically reciprocating said arm in timed relationship with the operation of said magazine and said pinch rollers to move said arm against the secured end of a bag from said conveyor to assist ejection of a secured bag from the range of operation of said device.

8. The invention as defined in claim 1 wherein said ejector mounting means includes a hinge element formed on the free end of said ejector, a guide block freely supporting said hinge, a cam roller, means pivotally connecting said guide block to said cam roller and a cam track for said cam roller whereby said hinge, guide block and cam roller adapt said ejector for generally straight relative movement through said head.

9. Flexible bag closing apparatus comprising,
(A) means for continuously advancing a succession of bags to a closing station.

(B) means for feeding and advancing to said station a succession of fasteners individually applicable to the bags and apertured to receive the bag necks, each fastener aperture being essentially of slot formation having an enlarged interior and an open mouth so narrow that a gathered bag neck is completely confinable in said interior,
(C) continuously moving power driven means operable at said station for gathering each bag neck into a respective fastener aperture, said gathering means presenting a pair of rotating surfaces positioned so close together as to flatten the bag material and pass it in flattened condition through the narrowed fastener mouth, whereby the bag neck is gathered and retained in said aperture independently of any deformation of the fastener, and
(D) means controlling said feed of the fasteners in timed relation with the arrival of the bags at said station.

10. Apparatus according to claim 9, in which said surfaces are the peripheral surfaces of a pair of wheels at least one of which is rotatably driven.

11. Apparatus according to claim 10, in which said fasteners are slotted plastic tabs and said feed means comprises means for feeding successive tabs to a location at which their apertures receive the flattened bag material immediately upon its passage from between said surfaces.

12. Flexible bag closing apparatus comprising,
(A) means for continuously advancing a succession of bags to a closing station,
(B) a pair of wheels positioned at said station to receive and advance the bag necks between them, said wheels being in such close peripheral proximity as to flatten the bag material.
(C) means for feeding in timed relation with said advancing means a succession of pre-formed slotted fastener tabs to a location at said station where the flattened bag material passes from between said wheels with the tab slots positioned to receive and gather the flattened material, and
(D) means for releasing the tabs and associated bags from said station.

13. Apparatus according to claim 12, in which said wheels are provided in pairs, individually coaxial, and said tabs are fed between one of said pairs.

14. A method of closing the slack neck of a partially filled flexible plastic bag, said method including the steps of flattening said neck in a given plane, with said neck extending away from the filled portion of said bag, pinching and pulling a side edge of said flattened bag neck at two fixed positions spaced from each other along said edge, said pulling being in parallel directions away from and normal to said bag neck, progressively advancing the grip of said pinching and pulling step to successive bag neck portions as the latter are drawn through said fixed positions so as to progressively draw a transverse section of said bag neck through said positions, and presenting a closure tab having a narrow edge opening, inwardly enlarged to form a closure aperture, with said opening lying abreast of and between said positions and close to said plane and facing the advancing bag neck section whereby the latter is progressively delivered through said opening and into said closure aperture, thus applying said closure tab to said bag neck and closing said bag.

15. A method of closing the neck portion of a partially filled flexible plastic bag, said method including the steps of conveying the bag with a continuous movement along a given path with said bag disposed at right angles to said path, and with said bag neck extending away from said bag, flattening said bag neck in a plane which is parallel with the direction of said movement, pinching the leading edge of said flattened bag neck at two fixed spaced positions in said plane as soon as said leading edge arrives opposite said positions by virtue of its movement with said bag along said path, pulling in said direction a short distance the portions of said bag neck thus pinched and then releasing the same, repeating said pinching and pulling action on portions of said bag neck disposed progressively further from said leading edge portions until a section of said flattened bag neck extending from the leading edge to the trailing edge thereof has been thus pinched, pulled a short distance in said direction and released, increment by increment, positioning a closure tab having a narrow edge opening, inwardly enlarged to form a closure aperture, with said opening lying between said positions and close to said plane and facing the advancing bag neck whereby said increments of the bag neck are delivered successively through said opening and into said closure aperture and the entire section aforesaid of said bag neck is thereby ultimately bunched within said aperture, thus effectively applying said closure tab to said bag, and releasing said closure tab to allow it to accompany said bag in said movement.

16. A mechanism for closing a flexible bag partially filed with a product by applying to the unoccupied neck portion thereof a flat closure tab having a bag neck confining aperture, access to which is had through a slot in an edge of the closure tab, said slot being sufficiently narrow to normally prevent a bag neck once delivered through said slot into said aperture from accidentally escaping therefrom, said mechanism comprising means for receiving and holding a closure tab in a given position with said slot presented in a given plane facing in a given direction to receive a bag neck flattened and presented to said slot edgewise in said plane; and bag neck feed means including two power-driven tangentially rotating pairs of wheels disposed on opposite sides of said closure tab with the common plane of tangency of said pairs of wheels located close to the aforesaid plane and with the areas of tangency between said respective pairs of wheels disposed approximately abreast of said slot whereby the delivery of spaced portions of a side edge of a flattened bag neck simultaneously between said rotating pairs of tangent wheels causes said side edge of said bag neck between said spaced portions to be propelled in flattened form through said slot and into said aperture while said side edge is being tightly gripped between said pairs of wheels, said feeding action continuing as said flattened bag neck is progressively drawn between said pairs of wheels until an entire cross-sectional zone of said bag neck has been fed through said slot and bunched together in said bag closure tab aperture.

17. A mechanism as recited in claim 16, wherein means is provided to convey a series of partially filled bags along a given path with the necks of said bags flattened and extending away from the product confined therein approximately in the aforesaid given plane and aligned with sadi pairs of feed wheels whereby said bag necks are successively delivered between said pairs of wheels; means for releasing each closure tab as the delivery of the neck of a bag into the aperture thereof is completed, to permit said closure tab to accompany the bag to which it has been attached; and means to replace each closure tab so released from said position by another closure tab delivered to said position in readiness for receiving the neck of the next bag of said series of conveyed bags.

References Cited by the Examiner
UNITED STATES PATENTS

| | | | |
|---|---|---|---|
| 1,551,525 | 8/1925 | Hamer | 53—138 X |
| 2,705,100 | 3/1955 | Paxton et al. | 53—138 |

TRAVIS S. McGEHEE, *Primary Examiner.*